United States Patent [19]
Wexler

[11] Patent Number: 5,134,923
[45] Date of Patent: Aug. 4, 1992

[54] LINEAR TO ROTARY MOVEMENT VALVE ACTUATOR

[76] Inventor: Zeev Wexler, 30 Sherit Aplita Haifa, Haifa, Israel

[21] Appl. No.: 631,381

[22] Filed: Dec. 20, 1990

Related U.S. Application Data

[63] Continuation-in-part of Ser. No. 431,986, Nov. 6, 1989, abandoned.

[30] Foreign Application Priority Data

Apr. 15, 1989 [DE] Fed. Rep. of Germany ... 8904747[U]

[51] Int. Cl.⁵ ................................................ F01B 3/00
[52] U.S. Cl. .......................................... 92/31; 92/13.8; 74/99 A
[58] Field of Search ................ 92/31, 32, 33, 5 R, 92/13.8, 13, 130 R, 130 A; 251/252, 257, 58; 74/99 A

[56] References Cited

U.S. PATENT DOCUMENTS

| | | | |
|---|---|---|---|
| 2,998,805 | 9/1961 | Usab | 74/99 A |
| 3,143,932 | 8/1964 | Lanman | 92/31 |
| 3,264,949 | 8/1966 | Dietlin | 92/31 |
| 3,319,925 | 5/1967 | Kojima et al. | 92/33 |
| 3,417,960 | 12/1968 | Stehlin | 251/58 |
| 3,450,382 | 6/1969 | Calim | 251/58 |
| 3,776,106 | 12/1973 | Pish | 74/99 A |
| 4,359,932 | 11/1982 | Childers | 92/31 |
| 4,361,078 | 11/1982 | Cape et al. | 92/31 |
| 4,504,038 | 3/1985 | King | 92/31 |
| 4,651,969 | 3/1987 | Dowall | 92/33 |

FOREIGN PATENT DOCUMENTS 3247609 7/1984 Fed. Rep. of Germany .......... 92/31

Primary Examiner—Edward K. Look
Assistant Examiner—Thomas Denion
Attorney, Agent, or Firm—Rogers, Howell & Haferkamp

[57] ABSTRACT

The invention is directed to a pneumatic or hydraulic rotational power drive particularly suited for a ball stopcock type valve, the power drive consisting of a power cylinder being located coaxially to the rotation axis of the cock plug, the piston rod stroke of which is convertible, via a spindal drive, to the rotary movement of a driving member being positively engaged with the cock plug. In such arrangement, the power cylinder may be designed comprising a piston or diaphragm, and for double action, i.e., working in either direction or working solely unidirectional while being reset by means of spring action.

6 Claims, 4 Drawing Sheets

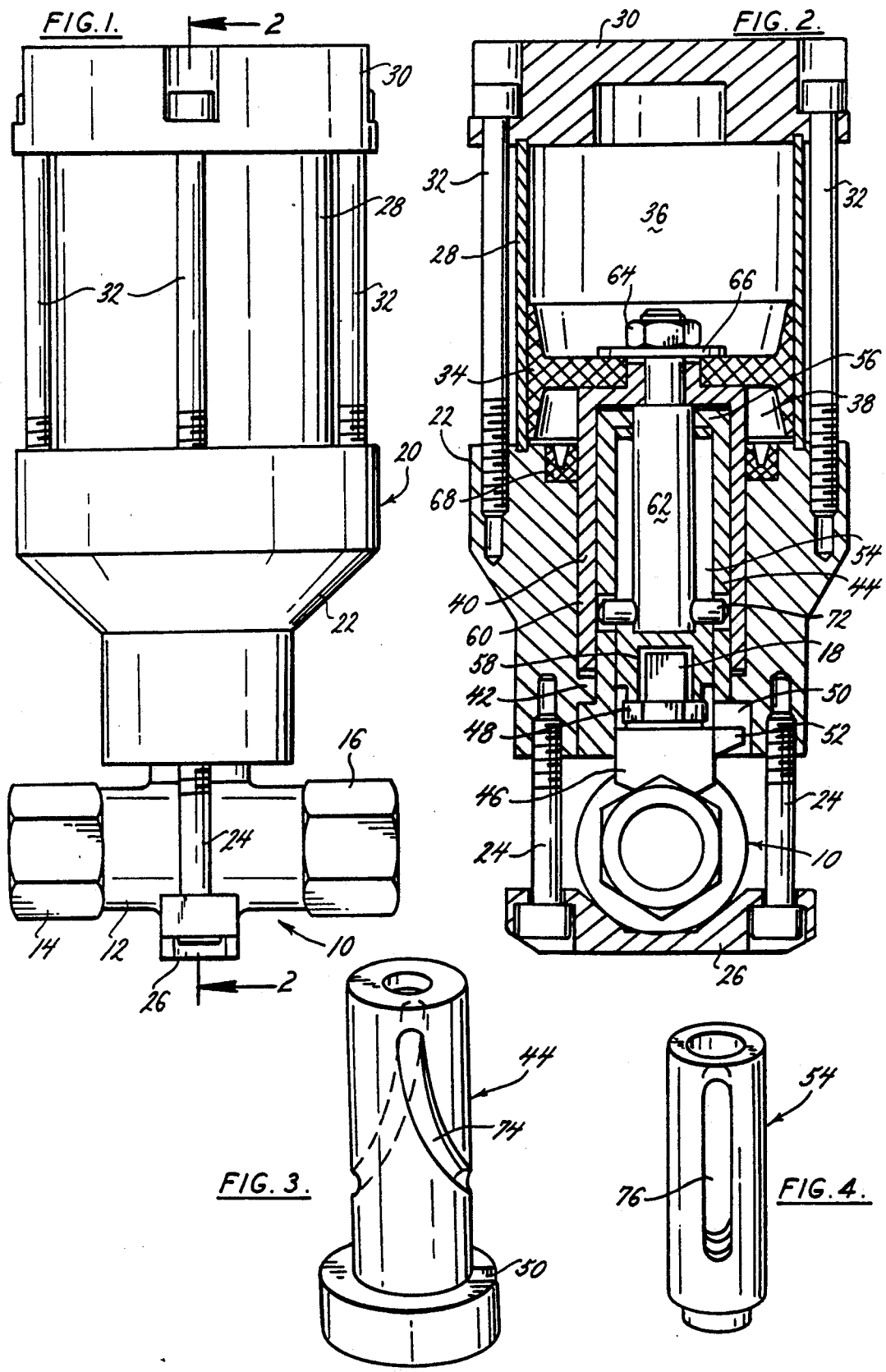

LINEAR TO ROTARY MOVEMENT VALVE ACTUATOR

BACKGROUND OF THE INVENTION

The present application is a continuation-in-part of patent application Ser. No. 07/431,986, filed Nov. 6, 1989 and currently abandoned.

(1) Field of the Invention

The present invention relates to a pneumatic or hydraulic rotary actuator particularly well suited for selectively rotating a ball stopcock of a valve. In particular, the present invention comprises a power cylinder or a diaphragm, each housing a reciprocating piston rod and each being positioned coaxial to the rotary axis of a valve stopcock. The linear piston rod stroke of the actuator is converted by a spindal drive to rotational movement of a driving member that is positively engaged with the valve stopcock. The power cylinder or diaphragm of the actuator may be designed for double action with pneumatic or hydraulic pressure being selectively applied to opposite sides of the piston or diaphragm, or may be designed for hydraulic or pneumatic pressure to be applied to only one side of the piston or diaphragm with a spring counteracting the pressure exerted on the piston or diaphragm.

(2) Description of the Related Art

In a known actuator for the pneumatic operation of valve ball stopcocks, air throttles, and interlocking devices of service doors (DE-OS 33 OB 109), a spindal drive is provided consisting of a course-pitch thread located inside a hollow piston rod that engages with an outer thread on a shaft-like driving member which is rotatable but not slidable in an axial direction. The construction of such a rotating drive is expensive and, with continued time of use, there is the hazard of contamination and blockage of such a drive system.

The present invention is directed to the objective of eliminating the aforesaid disadvantages by designing a rotating drive of the type mentioned initially above, in that the manufacture of the drive is essentially simplified thus reducing the cost price per unit as well as giving it a far-reaching immunity against being contaminated.

SUMMARY OF THE INVENTION

The actuator of the present invention is advantageously designed for double action by pneumatic or hydraulic pressure, or unidirectional action by pneumatic or hydraulic pressure where the piston or diaphragm housed in the power cylinder is returned by a spring. This advantageous design enables a helical pressure spring to be positioned enclosing the control sleeves of the actuator of the invention while being retained in a bore provided in one of the power cylinder end walls. The spring is set prestressed between a flat stop at the bottom of the bore and the piston or diaphragm of the power cylinder. In the design of the actuator of the present invention, an axial bearing is placed at one end of the helical pressure spring to enable unrestrained relative rotation between the spring ends as the axial length of the spring changes.

BRIEF DESCRIPTION OF THE DRAWINGS

Further objects and features of the present invention are revealed in the following detailed description of the preferred embodiment of the invention and in the drawing figures wherein:

FIG. 1 is a side view of a ball stopcock type valve with a rotating drive actuator of the present invention attached thereto, the actuator being driven by a double action power cylinder;

FIG. 2 is a side view in section of the actuator of the present invention taken along the line 2—2 of FIG. 1;

FIG. 3 shows a perspective view of an outer control sleeve of the rotating actuator of the present invention;

FIG. 4 shows a perspective view of an inner control sleeve of the rotating actuator of the present invention;

DESCRIPTION OF THE PREFERRED EMBODIMENTS

Figure 5:
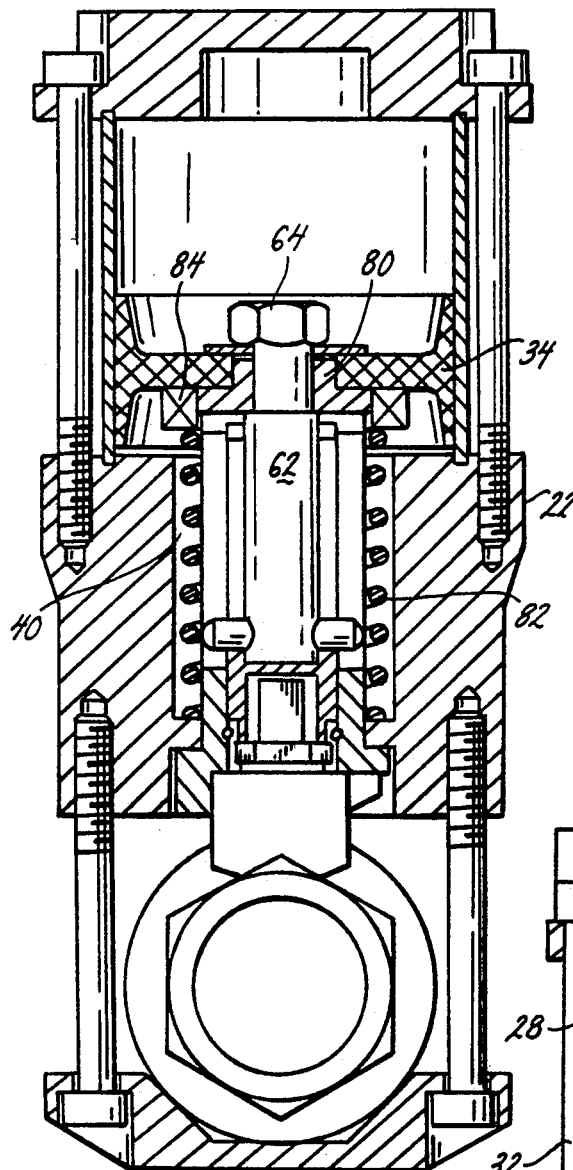
FIG. 5 is a side view in section of the actuator of the present invention connected with a unidirectional power cylinder and employing a spring biasing the piston in one direction.

FIGS. 1 and 2 show a conventional ball-type stopcock valve 10 comprising generally a metal housing 12 with pipe connections 14, 16 at opposite ends of the housing. A spherical key or stopcock (not shown) is provided inside the valve housing. The stopcock is rotated 90° between an open position and a closed position by turning a shaft having a squared end 18 projecting from the top of the valve housing.

The rotating drive actuator 20 of the present invention is designed to selectively turn the valve stopcock 90° between its open and closed positions. The embodiment of the actuator of the present invention shown in FIGS. 1 and 2 comprises a double acting piston that may be operated by pneumatic or hydraulic pressure. The rotating drive actuator 20 of the invention is comprised of a cast metal housing 22 clamped to the valve stopcock housing 12 by a pair of bolts 24 and a yoke 26 that together secure the valve housing 12 to the actuator. The housing 22 forms one front wall of a double-action power cylinder. The power cylinder is comprised of a tubular casing wall 28 that is seated and sealed into a annular groove provided on one end of the housing 22. The other end of the tubular casing is seated and sealed in a lid 30 which forms the other end wall of the power cylinder. The tubular casing 28 is secured between the housing 22 and the lid 30 by bolts 32 that extend through the lid and are screwed into the housing. A piston 34 is fit tight within the tubular casing 28 and is designed for sliding movement between the opposite end walls of the cylinder. The piston separates an upper work chamber 36 of the cylinder interior from a lower work chamber 38 of the cylinder interior. The upper and lower work chambers may be alternately filled with pressurized air or fluid, while the air or fluid filling the opposite chambers is vacated, by inlets (not shown) communicating with the upper and lower chambers to selectively lower or lift the piston 34 in the chamber interior.

A bore 40 extends through the housing 22 coaxial with the casing 28 axis. A collar 42 is formed in the bore 40 spaced slightly above the lower end of the bore. The collar 42 forms a limiting flat stop for a outer control sleeve 44 inserted into the housing 22. The control sleeve 44 is inserted into the housing from the lower end of the bore 40 until it abuts against the collar 42. The collar prevents further axial movement of the outer control sleeve. An extension 46 of the valve housing 12 projects upward into the interior of the outer control sleeve 44. A packing nut 48 is threaded into the extension 46 to seal off the operating shaft 18 of the ball type stopcock contained in the valve housing. A radial slot 50 is provided at the lower enlarged end of the control sleeve 44. The slot 50 excepts a nose-shaped projection 52 from the valve extension 46. The projection 52 prevents rotational movement of the outer control sleeve 44 relative to the valve housing 12.

A second control sleeve 54 is fit inside the interior of the outer control sleeve 44. An inwardly inclined ring collar 56 at the top end of the outer control sleeve 44 prevents the upward axial movement of the inner control sleeve 54. The lower end of the inner control sleeve 54 is provided with a square aperture 58 into which the square shaft end 18 of the ball-type stopcock valve is positively engaged. The packing nut 48 of the valve housing 12 prevents the downward axial movement of the inner control sleeve 54.

The piston 34 slidably received in the cylinder tubular casing 28 is provided with a central bore into which a hollow outer piston rod 60 and a central inner piston rod 62 are inserted. The outer piston rod and inner piston rod are fastened to the piston 34 by a threaded nut 64 and a sealing washer 66. The outer piston rod 60 is tubular and projects downward. The outer rod is rotatably received in an upper portion of the housing bore 40 outside the outer control sleeve 44. A collar gasket 68 seals the sliding engagement between the outer piston rod 60 and the bore 40 of the housing 12. The inner or second piston rod 62 extends downward from the piston and is slidably received in the interior of the inner control sleeve 54. The inner piston rod carries at its lower end a crossbolt 72. Protruding opposite ends of the crossbolt 72 extend through two pairs of slots 74, 76, each pair being provided in the outer and inner control sleeves 44, 54, respectively. The slots 76 in the inner control sleeve 54 runs straight and parallel with the axis of the tubular casing 28 and the housing bore 40. The slots 76 in the inner control sleeve 54 are best seen in FIG. 4. The slots 74 in the outer control sleeve 44 run in a helical fashion around the axis of the outer control sleeve 44. The slots 74 in the outer control sleeve 44 are best seen in FIG. 3.

With the piston 34 at its lower limit position in the cylindrical casing 28 of the power cylinder shown in FIG. 2, the ball-type stopcock of the valve 12 is in its off position blocking the flow of fluid through the valve. If it is desired to rotate the stopcock 90° to open the valve, the upper work chamber 36 of the cylinder of the drive actuator 20 is decompressed and the lower work chamber 38 is connected to a supply of pressurized air or fluid. This results in a pressure force being exerted on the lower face of the piston 34 and the upward movement of the piston in the cylinder casing 28. The upward movement of the piston is transmitted by the inner piston rod 62 to the crossbolt 72 causing the crossbolt to rise along with the piston and piston rod. As the crossbolt 72 rises relative to the stationary outer control sleeve 44, the slots 74 of the outer control sleeve cause the crossbolt, the inner piston rod 62, together with the piston 34 and outer piston rod 60 to rotate. The crossbolt 72 transmits the rotating movement to the inner control sleeve 54 resulting in a revolving movement of the inner control sleeve and the valve ball-type stopcock due to the positive connection between the inner sleeve 54 and the squared shaft end 18 of the stopcock. The helical slot 74 in the outer control sleeve will cause the inner control sleeve to rotate the valve stopcock 90° as the piston is raised.

If it is desired to rotate the valve ball-type stopcock 90° to its closed position, the lower work chamber 38 of the cylinder casing 28 is decompressed and the upper work chamber 36 is connected to a supply of pressurized air or fluid. The pressurized air or fluid supplied to the upper work chamber 36 will cause the piston 34 to move downward in the cylinder casing 28 and will cause the valve stopcock to rotate to its closed position by sequence of operations that is the reverse of those described above.

FIG. 5 shows a second embodiment of the actuator of the invention employed in a unidirectional single action power cylinder that comprises a piston that is spring biased in an upward direction.

Component parts of this embodiment of the invention that are the same as those previously described with reference to FIGS. 1-4 are given their same reference numbers in FIG. 5.

In this embodiment of the invention, because no pneumatic or hydraulic fluid acts on the underside of the piston 34, there is no need for the outer piston rod 60 of the first embodiment of the invention and the outer piston rod is removed. A disc 80 having a central collar is provided on the underside of the piston 34 with the collar extending through the central bore of the piston. The inner piston rod 62 extends through the central collar provided on the disc 80 and both the inner piston rod and the disc are secured to the piston 34 by a threaded fastener 64 as in the first embodiment of the invention. The bore 40 of the housing is made slightly larger and does not require a recess at its upper end for the collar gasket 68 of the first embodiment. Instead, a helical pressure spring 82 is inserted into the widened bore 40 with a lower end of the spring resting against the collar 42 at the lower end of the bore. The spring 82 is prestressed and the upper end of the spring exerts a force against the underside of the piston 34 with a thrust bearing 84 being inserted between the spring and piston. The thrust bearing 84 permits free rotational movement of the upper spring end relative to the lower spring end when the pressure spring 82 is either compressed or relaxed.

In the closed position of the ball-type stopcock of the valve, the helical string 82 forces and holds the piston 34 in its uppermost limit position at the top of the cylinder casing 28. If it is desired to rotate the stopcock 90° and open the valve, pressurized air or fluid is introduced into the upper work chamber 36. The pressurized air or fluid exerts a force on the piston 34 causing the piston to move downward and further compress the prestressed helical spring 82. The downward movement of the piston 34 causes the actuator to rotate the valve stopcock 90° to its open position in the same manner as previously described with regard to the embodiment of FIGS. 1-4. If it is desired to again close the ball-type stopcock of the valve, the working chamber 36 of the cylinder casing is decompressed, thereby relieving the pressure force acting on the top surface of the piston 34 against the helical spring 82 and enabling the spring to reposition the piston 34 at its upper limit position in the cylinder casing.

Figure 6:
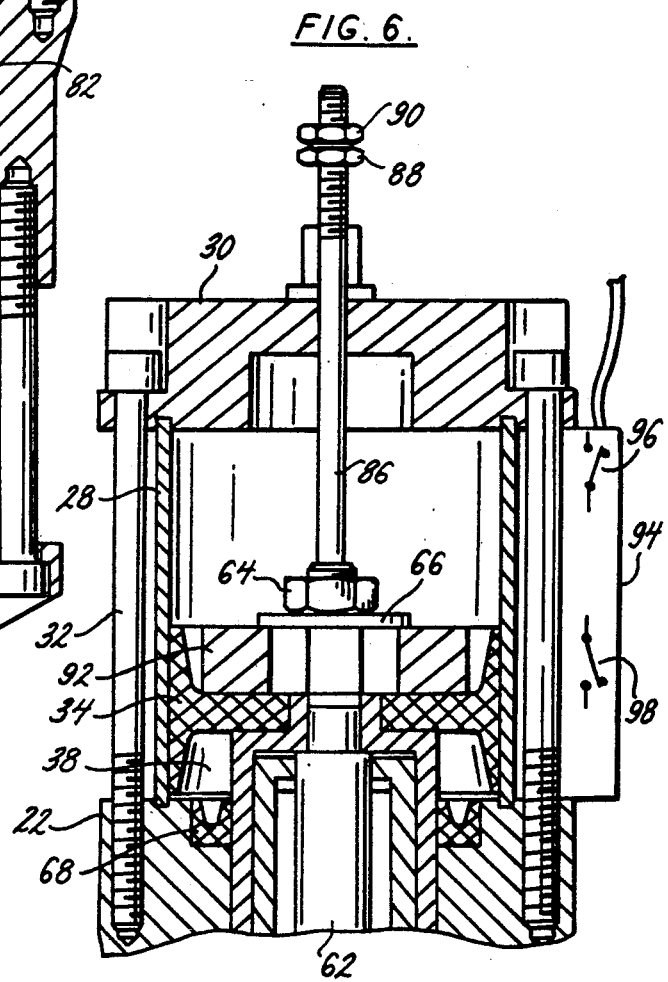
FIG. 6 shows a segmented side view in section of two different devices employed to show the position of the piston in the power cylinder, one of the devices being a reed switch attached to the outside of the cylinder casing.

FIG. 6 shows the top portion of the actuator of the embodiment of FIG. 2 including two different devices that are employed to show the position of the piston 34 inside the cylinder casing 28, and thereby provide a visual indication of whether the valve stopcock is in the open or closed position. A first of these devices consists of a rod 86 that is an extension of the threaded section of the inner piston rod 62. The rod 86 protrudes upward through the top lid 30 through a sealed aperture. The upper end of the rod 86 protruding from the power cylinder is threaded and is fitted with a pair of nut fasteners 88, 90. The position of the nut fasteners 88, 90 relative to the top of the power cylinder provides a visual indication of the position of the piston in the cylinder, and whether the valve stopcock is in the open or closed position. The nut fasteners may also be used to adjust the extent of piston movement.

The second position indicating device which may be used by itself or in combination with the first described indicating device comprises a annular permanent magnet 92 attached to the top surface of the piston 34 by a washer 66 and threaded nut fastener 64 that are screw threaded on the thread section of the piston rod 62 projecting upward through the piston. A double acting sensor 94 is provided on the exterior of the cylinder casing 28. The double acting sensor 94 interacts with the magnetic force of the magnet 92 that penetrates through the nonmagnetic cylinder casing 28. The double acting sensor 94 contains two power-flux sensitive switching contacts 96, 98 that are operated in alternate fashion depending on the position of the piston 34 and the magnet 92. The advantage of this particular type of indication device is first seen in the possibility of transmitting a signal indicative of piston and valve stopcock position to a remove sight, and secondly in monitoring disturbances or failure of the actuator operation by both switches closing when the piston is stuck in an intermediate position.

Figure 7:
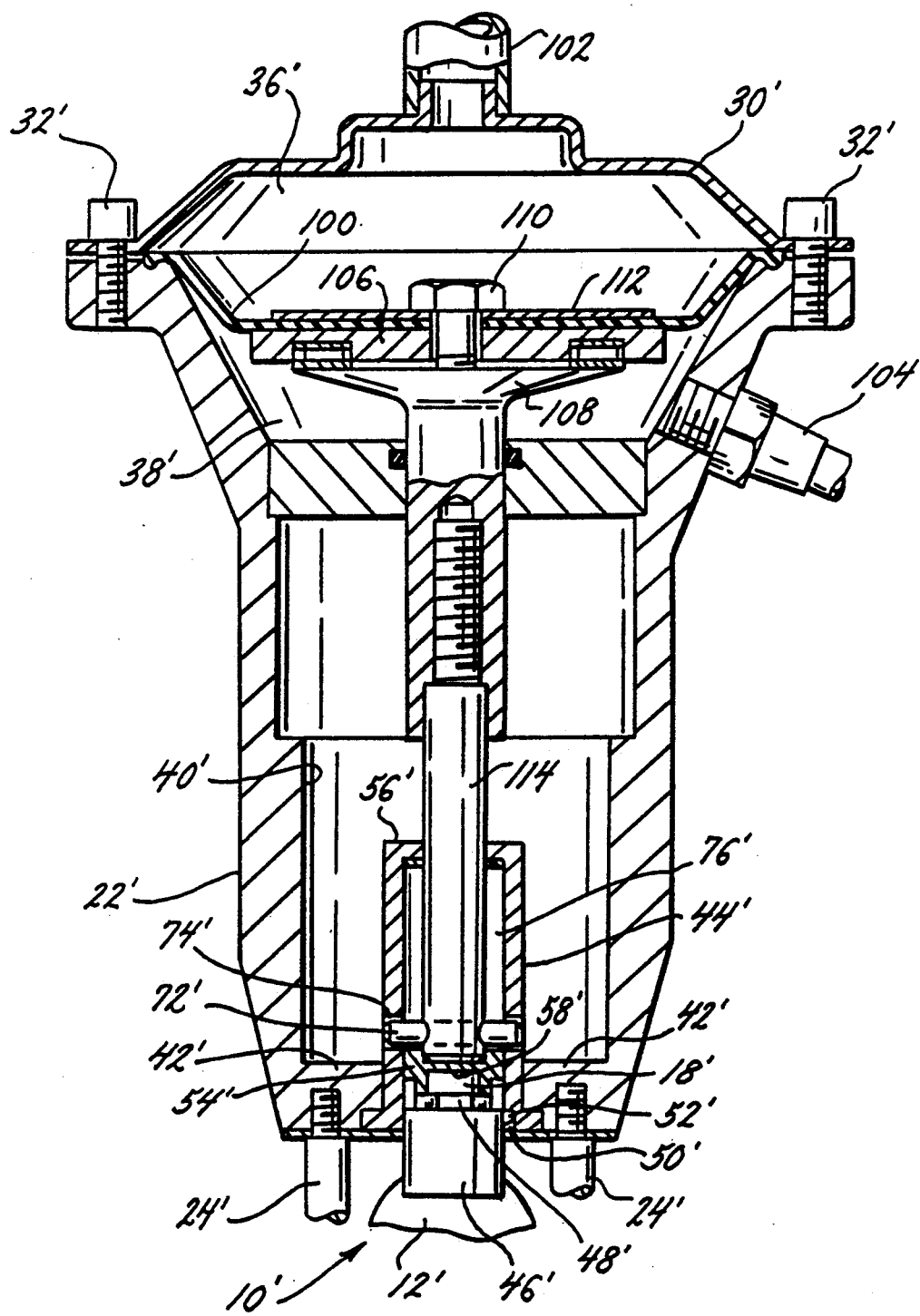
FIG. 7 shows a side view in section of the actuator of the present invention connected with a diaphragm operated double action power cylinder.
Figure 8:
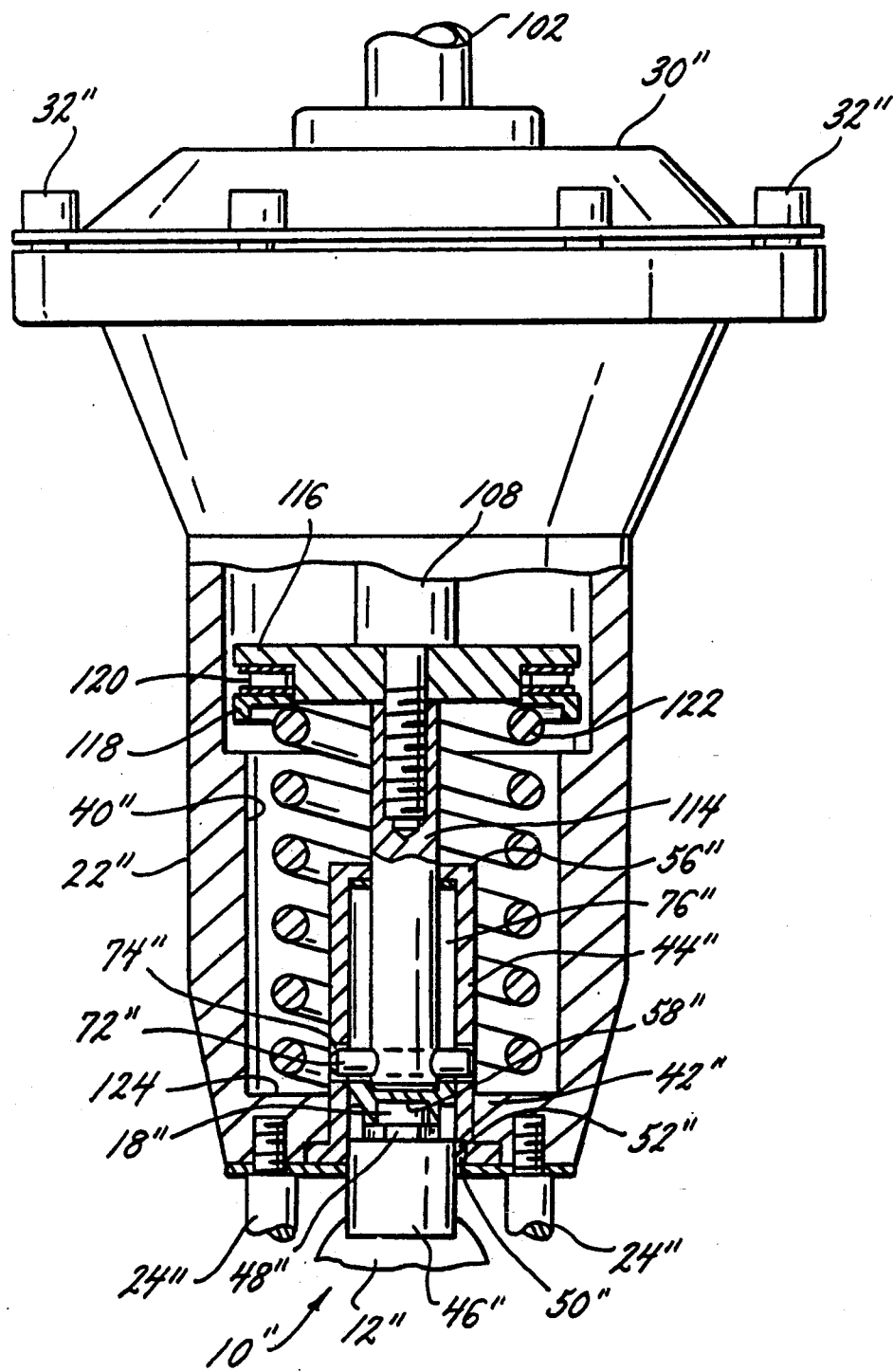
FIG. 8 shows a side view partially in section of the actuator of the present invention connected with a unidirectional action diaphragm power cylinder reset by a helical spring.

FIGS. 7 and 8 show two additional embodiments of the rotary actuator of the invention employing diaphragm operated pistons in lieu of the pistons of FIGS. 1-5.

Many of the structural components of the embodiments of the invention shown in FIGS. 7 and 8 are identical to or only slight variations of structural components previously described with reference to FIGS. 1-5. These identical or similar structural components of FIGS. 7 and 8 are labeled by the same identifying number as the embodiments of FIGS. 1-5 except that the numbers of FIG. 7 are followed by a prime and the numbers of FIG. 8 are followed by a double prime.

FIG. 7 shows a conventional ball-type stopcock valve 10' comprising a metal housing 12' that is substantially identical to the valve housing described previously with regard to FIGS. 1 and 2. The valve comprises a spherical stopcock (not shown) that is rotated through 90° between an open and closed position by turning a shaft having a squared end 18'.

The turning of the stopcock is achieved by the rotating actuator 20' of the present invention. The embodiment of the actuator shown in FIG. 7 is a double acting diaphragm type actuator. This type of actuator may be operated by either pneumatic or hydraulic pressure. The actuator includes a cast metal housing 22' clamped to the valve housing 12' by a pair of bolts 24' and a yoke (not shown) in the same manner as the embodiment of FIGS. 1 and 2. The housing 22' forms one half of a double-action diaphragm actuator. The lid 30' forms the second half of the diaphragm actuator and is bolted to the housing 22' by bolts 32'. A diaphragm is provided inside the diaphragm actuator formed by the housing 22' and the lid 30'. The diaphragm 100 separates the interior of the actuator into a upper work chamber 36' and a lower work chamber 38' which are alternately filled with compressed air or fluid or decompressed via the inlet connections 102, 104 in order to lower or lift, respectively, the diaphragm 100.

The housing 22' also contains a straight through bore 40' coaxial with the axis of the housing 22' and the lid 30'. The bore 40' also includes a collar 42' spaced slightly upward from the bottom of the bore. The collar 42' forms a limiting stop for an outer control sleeve 44'. The outer control sleeve 44' is inserted into the bottom of the bore 40' and is secured against axial movement by the collar 42'. An extension 46' of the valve housing 12' extends into the outer control sleeve 44'. A packing nut 48' is screw threaded into the extension 46' to seal off the operating shaft 18' of the valve stopcock. A radial slot 50' at the lower enlarged end of the outer control sleeve 44' excepts a nose-shaped projection 52' of the stopcock housing extension 46'. The projection 52' prevents the outer control sleeve 44' from being rotated relative to the valve housing 12' and the actuator housing 22'.

A second inner control sleeve 54' is rotatably received in the interior of the outer control sleeve 44'. The inner control sleeve 54' is prevented from moving axially in the outer control sleeve 44' interior by an inwardly inclined ring collar 56' of the outer control sleeve. The lower end of the inner control sleeve 54' is provided with a square aperture 58' that positively engages on the square shaft end 18' of the valve ball-type stopcock. The packing nut 48' prevents the inner control sleeve 54' from sliding axially downward.

The diaphragm 100 includes a center disc 106 having a central bore into which a piston rod assembly 108 is inserted and fastened with a threaded nut 110 and a sealing washer 112. A piston rod extension 114 extends downward from the piston rod and is slidably received in the interior of the inner control sleeve 54'. The piston rod extension carries at its lower end a crossbolt 72'. Protruding ends of the crossbolt 72' extend through two pairs of slots 74', 76', with each pair of slots being provided in the outer control sleeve 44' and the inner control sleeve 54' respectively. The slots 76' in the inner control sleeve 54' run straight and parallel to the axis of the control sleeves and the piston rod 108. The slots 74' in the outer control sleeve 44' run in a helical fashion around the axis of the control sleeves and the piston rod 108.

In the position of the diaphragm shown in FIG. 7, the ball-type stopcock of the valve 10' is in the closed position. If it is desired to rotate the stopcock of the valve 90° to its open position, the upper work chamber 36' of the diaphragm assembly is decompressed and the lower work chamber 38' of the diaphragm is connected to a source of pressurized air or fluid. The pressurized air or fluid supplied to the lower chamber 38' through the inlet 104 exerts a force on the lower side of the diaphragm 100 and forces the diaphragm upward. The upward movement of the diaphragm 100 is transmitted through the rod assembly 108 and the rod extension 114 to the crossbolt 72'. As the crossbolt 72' moves upward it follows the helical groove 74' of the outer control sleeve 44' and causes the rod extension 114 to rotate. The rotating movement of the crossbolt 72' is transmitted to the inner control sleeve 54' resulting in a rotating movement of the inner control sleeve 54' that is transferred through the squared end 18' of the stopcock shaft and causes the valve stopcock to rotate to its open position.

Should it be desired to close the stopcock of the valve, the lower work chamber 38' is decompressed and the upper work chamber 36' is connected to a supply of pressurized air or fluid through the inlet 102. The pressurized air or fluid supplied to the upper work chamber 36' exerts a downward force on the top surface of the diaphragm 100 causing the diaphragm to move downward. The downward movement of the diaphragm causes the rod 108, rod extension 114, and the crossbolt 72' to move downward. This results in a reversed sequence of operations to that just described and causes the stopcock of the valve to be rotated 90° to its closed position.

The embodiment of the invention shown in FIG. 8 is substantially identical to that shown in FIG. 7 except that it employs a single-action, unidirectional diaphragm that is reset to its at rest position with the valve stopcock in the closed position by a spring. Component parts of this embodiment of the invention are identified by the same reference numerals as the component parts of the previously described embodiment of the invention of FIG. 7 except that the reference numerals are followed by a double prime.

The embodiment of the invention shown in FIG. 8 includes a thrust bearing disc 116 positioned intermediate the connection of the piston rod 108 to the rod extension 114. An annular thrust bearing ring 118 is provided below the bearing disc 116 and an annular roller bearing assembly 120 is provided between the disc and ring. A helical pressure spring 122 is set prestressed in the bore 40" with the lower end of the spring resting against a bottom surface 124 of the bore and a top end of the spring engaging the annular bearing ring 118. The thrust bearing disc 116, the roller bearing assembly 120, and the thrust bearing ring 118 enable relative rotation between the upper and lower ends of the helical spring 122 as the spring is compressed or extended.

During the state of rest of the actuator the helical spring 122 forces the diaphragm 100 into its upper limit position in which the center disc 106 of the diaphragm engages against the interior surface of the lid 30" of the diaphragm assembly. In this position of the diaphragm, the ball-type stopcock of the valve is in its closed position. If it is desired to open the stopcock, pressurized air or fluid is introduced through the inlet 102 into the upper work chamber 36'. The pressurized air or fluid exerts a downward force on the diaphragm 100 causing the diaphragm to move downward and compress the spring 122, thus rotating the inner control sleeve 54" in the same manner as described with reference to FIG. 7 to the open position of the valve stopcock shown in FIG. 8.

If it is desired to close the ball-type stopcock of the valve, the upper work chamber 36' of the diaphragm assembly is decompressed and the helical spring 122 forces the bearing disc 116 and the diaphragm 100 upward to the upper limit position of the diaphragm thereby causing the inner control sleeve 54" to rotate and cause the valve stopcock to rotate to its closed position.

The present invention may be used to control the flow of water as well as many other liquids. It should also be understood that the slots of the control sleeves of the invention may also be modified so that the actuator of the invention will rotate a valve stopcock either 90°, 180° or any angle of rotation therebetween.

While the present invention has been described by reference to specific embodiments, it should be understood that modifications and variations of the invention may be constructed without departing from the scope of the invention defined in the following claims.

What is claimed is:

1. A fluid pressure powered rotating drive adapted for application to a shut-off valve having a stopcock key rotatable about a turning axis, comprising:
   a power cylinder arranged coaxially with the turning axis of the stopcock key, the power cylinder being a single-action power cylinder which is resettable by a biasing means which is a helical pressure spring enclosing the control sleeves, said spring being contained by a bore in an end wall of the power cylinder and having been inserted prestressed between a firm limit stop in the bore and the piston rod, the power cylinder having a central piston rod associated therewith, the piston rod having a diametral crossbolt;
   inner and outer concentric control sleeves secured against axial dislocation with respect to the power cylinder, one of the inner and outer concentric control sleeves having slots therein running helically about the axis of the sleeves and the other of the inner and outer concentric control sleeves having longitudinal slots therein, the one sleeve being secured against rotational movement with respect to the power cylinder and the other sleeve forming a driving member matingly engaged with the stopcock key;
   such that opposed ends of the crossbolt of the piston rod each project into one of the slots of the inner sleeve and into one of the slots of the outer sleeve and a stroke from the piston rod is transferable via the helical slot to rotating motion of the driving member.

2. A fluid pressure powered rotating drive as set forth in claim 1 wherein the drive is pneumatically powered.

3. A fluid pressure powered rotating drive as set forth in claim 1 wherein the drive is hydraulically powered.

4. A fluid pressure powered rotating drive as set forth in claim 1, further comprising an axial thrust bearing engaging an end of the spring.

5. A fluid pressure powered rotating drive adapted for application to a shut-off valve having a stopcock key rotatable about a turning axis, comprising:
   a power cylinder arranged coaxially with the turning axis of the stopcock key, the power cylinder having a central piston rod associated therewith, the piston rod having a diametral crossbolt;
   inner and outer concentric control sleeves secured against axial dislocation with respect to the power cylinder, the outer sleeve having slots therein running helically about the axis of the sleeves and the inner sleeve having longitudinal slots therein, the outer sleeve being secured against rotational movement with respect to the power cylinder and having an end nearer the power cylinder and an end away from the power cylinder, the outer sleeve having at the end nearer the power cylinder an inwardly inclined flange forming an axial limit stop for the inner sleeve, and the inner sleeve forming a driving member matingly engaged with the stopcock key;

such that opposed ends of the crossbolt of the piston rod each project into one of the slots of the inner sleeve and into one of the slots of the outer sleeve and a stroke from the piston rod is transferable via the helical slot to rotating motion of the driving member.

6. A fluid pressure powered rotating drive adapted for application to a shut-off valve having a stopcock key rotatable about a turning axis, comprising:

a power cylinder arranged coaxially with the turning axis of the stopcock key, the power cylinder being a double-action cylinder in which an axially movable hollow piston rod encloses the control sleeves and projects through an end wall of the power cylinder and a fluid seal is situated between the end wall and the hollow cylinder, the power cylinder having a central piston rod associated therewith, the piston rod having a diametral crossbolt;

inner and outer concentric control sleeves secured against axial dislocation with respect to the power cylinder, one of the inner and outer concentric control sleeves having slots therein running helically about the axis of the sleeves and the other of the inner and outer concentric control sleeves having longitudinal slots therein, the one sleeve being secured against rotational movement with respect to the power cylinder and the other sleeve forming a driving member matingly engaged with the stopcock key;

such that opposed ends of the crossbolt of the piston rod each project into one of the slots of the inner sleeve and into one of the slots of the outer sleeve and a stroke from the piston rod is transferable via the helical slot to rotating motion of the driving member.

* * * * *